US005253062A

United States Patent [19]

Ohta

[11] Patent Number: 5,253,062

[45] Date of Patent: Oct. 12, 1993

[54] IMAGE DISPLAYING APPARATUS FOR READING AND WRITING GRAPHIC DATA AT SUBSTANTIALLY THE SAME TIME

[75] Inventor: Takeshi Ohta, Tokyo, Japan

[73] Assignee: Fuji Photo Film Co., Ltd., Kanagawa, Japan

[21] Appl. No.: 762,605

[22] Filed: Sep. 19, 1991

[30] Foreign Application Priority Data

Sep. 28, 1990 [JP] Japan .................................. 2-257371
Aug. 8, 1991 [JP] Japan .................................. 3-222441

[51] Int. Cl.[5] .............................................. H04N 5/14
[52] U.S. Cl. ...................................... 358/160; 358/148
[58] Field of Search ................ 358/160, 183, 148, 230

[56] References Cited

U.S. PATENT DOCUMENTS 5,014,128 5/1991 Chen .................................. 358/160

*Primary Examiner*—Victor R. Kostak

[57] ABSTRACT

An image displaying apparatus has a dual port memory with a plurality of memory fields. Picture data generated by an NTSC TV camera are sequentially inputted to the serial ports of the dual port memory and then read out via the serial ports to be transferred to a video monitor. Since the transfer of data between each serial port and the memory field associated therewith is effected in parallel, the transfer is performed during the blanking period of the video monitor. In a period other than the blanking period, display data are sequentially fed from one serial port to the video monitor, while video data are fed to the other serial port. During such an input/output period, graphic data generated by a graphic processor are randomly written to the memory via random ports. The graphic data and the picture data are stored in the memory fields to produce display data to be displayed on the video monitor.

10 Claims, 7 Drawing Sheets

*F I g. 2B*

IMAGE DISPLAYING APPARATUS FOR READING AND WRITING GRAPHIC DATA AT SUBSTANTIALLY THE SAME TIME

BACKGROUND OF THE INVENTION

1. Field of the Invention

The present invention relates to an image displaying apparatus and, more particularly, to an image displaying apparatus for transferring an image to and displaying the image on an NTSC (National Television System Committee), HDTV (High Definition Television) or similar video monitor.

2. Description of the Related Art

A dual port video memory having a great capacity is a recent achievement for coping with the digitization of video technologies and is extensively used in various fields. This kind of memory has a memory field for storing image data, and a serial port and a random port for inputting and outputting video data from the memory field therethrough. Specifically, data are serially written and read out of the memory field via the serial port, and the memory field, like an ordinary dynamic memory, is accessed randomly via the random port to write or read data in or out of the memory field. While data from a graphic processor, for example, are inputted or outputted via the random port by random access, continuous data based on the scanning lines of a TV frame are inputted or outputted via the serial port substantially at the same time. More specifically, the two ports are switched over to input and output data alternately.

With a conventional image displaying apparatus having a dual port video memory, it has been customary to assign the serial port of the memory to, for example, the display of an image and the random port to the input of data from a TV camera and the input/output of data from a graphic processor. In such a case, a field memory capable of accommodating one field of data is associated with the random port in order to store picture data from a TV camera temporarily in the field memory. When graphic data, as distinguished from picture data, from the graphic processor has been fully written to and read out of the memory, the picture data having been stored in the field memory are inputted to the memory via the random port.

The conventional field-by-field input and output scheme described above has some problems left unsolved, which are described as follows. When continuous data such as moving picture data generated by a video camera are transferred to the dual port video memory, the random port of the memory is continuously occupied by the picture data and cannot be used to transfer graphic data. Conversely, while graphic data is written in the memory, the moving picture data from the camera cannot be transferred via the random port. Therefore, it is impracticable with the conventional apparatus to handle moving picture data and graphic data at the same time without resorting to some special implementation. Moreover, the field memory used to effect the transfer of picture data from a camera is expensive and increases the overall cost of the apparatus.

SUMMARY OF THE INVENTION

It is, therefore, an object of the present invention to provide an image displaying apparatus capable of effecting the input and display of TV picture data and, further, the reading and writing of graphic data substantially at the same time with a minimum of cost.

An apparatus for transferring video data fed from an image pick-up device and displaying the video data on a video monitor of the present invention includes a video memory comprising at least two memory fields each of which has a serial inputting/outputting section for selecting inputting or outputting data serially and a random inputting/outputting section for selecting inputting or outputting data randomly. The memory fields each has a capacity great enough to store video data constituting at least one scanning line of a video frame to be displayed on the video monitor. A selector selectively applies the video data from the image pick-up device to either one of the serial inputting/outputting sections of the memory fields of the video memory. A controller controls the video memory and selector such that the video data fed from the image pick-up device via the selector are sequentially inputted to each of the serial inputting/outputting sections of the video memory every horizontal scanning line, and another kind of data from the random inputting/outputting section of the video memory are stored in the memory fields, whereby every horizontal line of video data is sequentially stored in each of the memory fields. Every horizontal scanning line of video data stored in each of the memory fields is sequentially transferred to the video monitor via the serial inputting/outputting section.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
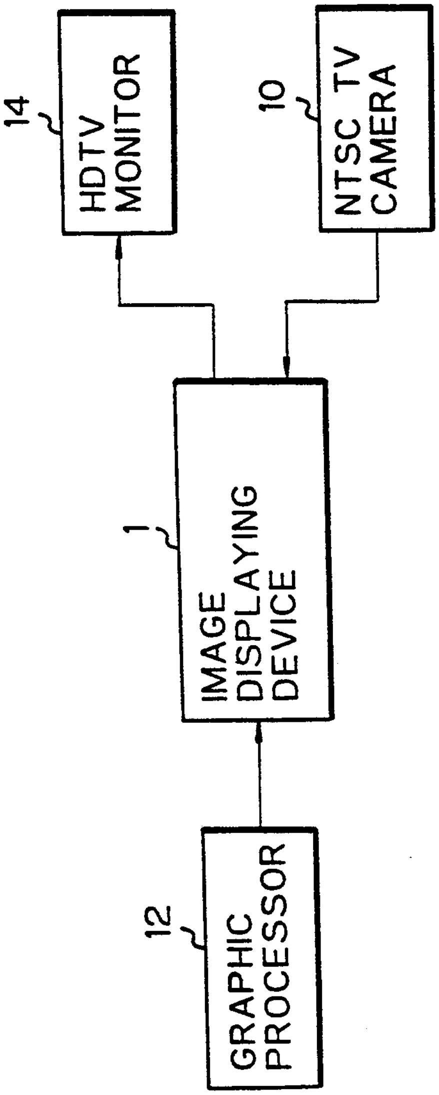
FIG. 1 is a block diagram schematically showing a specific connection of an image displaying apparatus embodying the present invention to independent units.

Referring to FIG. 1 of the drawings, an image displaying apparatus embodying the present invention is shown and generally designated by the reference numeral 1. As shown, the image displaying apparatus 1 is constructed and arranged to display picture data fed from an NTSC TV camera 10 and graphic data fed from a graphic processor 12 on an HDTV monitor 14 at the same time. A specific construction of the apparatus 1 will be described with references to FIGS. 2A and 2B.

Figure 2A:
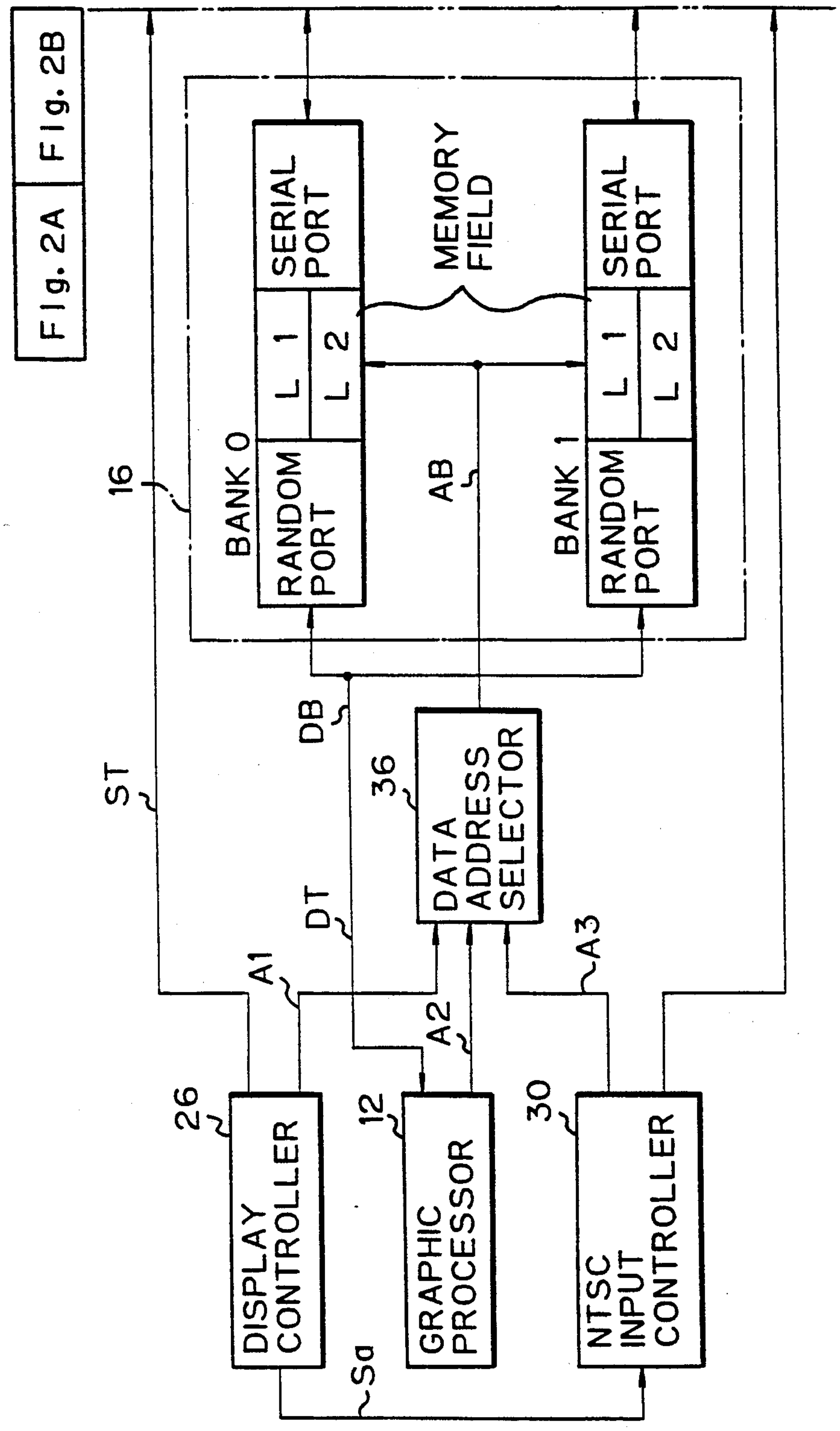
FIGS. 2A and 2B are block diagrams showing, when combined as shown in FIG. 2, a specific construction of the embodiment.

As shown in FIG. 2A, the image displaying apparatus 1 includes a dual port memory 16 having random ports at one side and serial ports at the other side thereof. The picture data from the NTSC TV camera 10 and the graphic data from the graphic processor 12 are applied to the dual port memory 16 via the serial ports and the random ports, respectively. The two different kinds of video data so written to the memory 16 are read out thereof via the serial ports as data to be displayed on the HDTV monitor 14, i.e., display data. Specifically, the display data are applied to the HDTV monitor 14 via an input/output data selector 38, FIG. 2B, and a digital-to-analog (DA) converter 40, FIG. 2B, under the control of a display controller 26. The picture data from the NTSC TV camera 10 is fed to the dual port memory 16 via an input data selector 34, FIG. 2B, a line buffer 18, FIG. 2B, and the input/output data selector 38. The display controller 26, the graphic processor 12 and an NTSC input controller 30 each access the dual port memory 16 via a data address selector 36.

The display controller 26 plays the role of an HDTV control circuit for generating HDTV timing signals ST for the display of video data on the HDTV monitor 14, and line addresses for reading display data out of the dual port memory 16. The timing signals ST include an input/output timing signal to be fed to the input/output data selector 38, a read timing signal to be fed to the line buffer 18, and a DA conversion timing signal to be fed to the DA converter 40. The display controller 26 feeds a line address A1 to the dual port memory 16 via the data address selector 36, FIG. 2A. Furthermore, the display controller 26 feeds a synchronizing (sync) signal Sa to the NTSC input controller 30 during the blanking period of the HDTV monitor 14.

The graphic processor 12 generates graphic data DT and delivers the graphic data DT to the dual port memory 16 while feeding a write address A2 to the memory 16 via the data address selector 36. As a result, the graphic data DT is written to the dual port memory 16. Specifically, a data bus DB is connected to the random ports of the dual port memory 16. Hence, the graphic data DT can be written to or read out of any address of the dual port memory 16 which is designated by the graphic processor 12 via the data address selector 36. This allows characters or similar graphic data to be inserted in or combined with data being displayed on the HDTV monitor 14 at any desired position on the HDTV monitor 14. In FIG. 2A, the graphic processor 12 is implemented as a processor board built in the image displaying apparatus 1. Alternatively, as shown in FIG. 1, the graphic processor 12 may be implemented as a personal computer or a similar graphic processor which is physically independent of the image displaying apparatus 1.

The NTSC input controller 30 is a control circuit for outputting, in response to the sync signal Sa from the display controller 26, control signals Sb–Se for controlling NTSC picture data. The control signals Sb–Se are respectively fed to the NTSC TV camera 10, the input data selector 34, the line buffer 18, and the input/output data selector 38 shown in FIG. 3, as will be described.

Figure 2B:
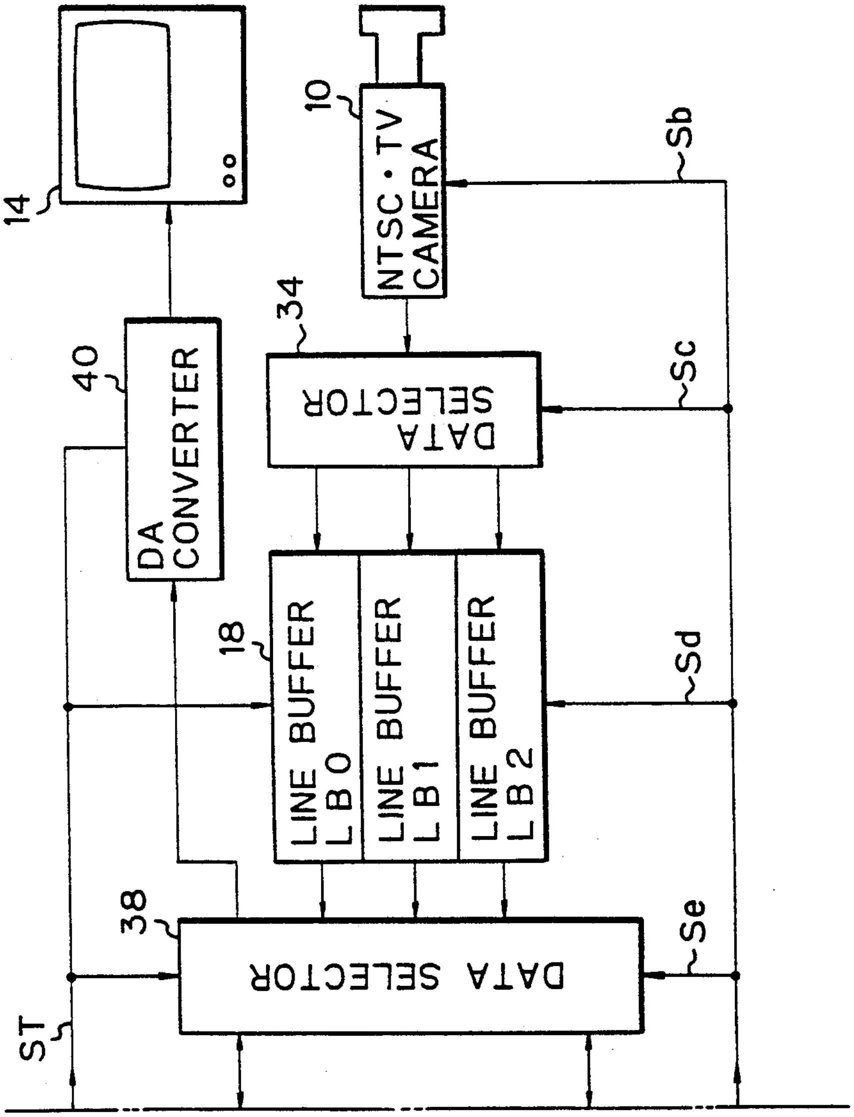

In FIG. 2B, the NTSC TV camera 10 feeds picture data to the input data selector 34 at an NTSC rate under the control of the control signal Sb which is applied thereto from the display controller 26. The line buffer 18 is implemented as at least two line buffers each being capable of storing one line of picture data which appears during a single horizontal scanning period. In the illustrative embodiment, the line buffer 18 is made up of three line buffers LBO–LB2 by way of example. In response to the address signal Sd, the line buffer 18 stores the picture data from the NTSC TV camera 10 which are cylically fed from the data selector 34 to the line buffers LBO–LB2 in synchronism with the control signal Sc. The picture data stored in the line buffer 18 are sequentially read out on the basis of the timing signal ST from the display controller 26. As a result, the picture data written to the line buffer 18 at the NTSC rate are read out at an HDTV rate.

The input/output data selector 38 feeds the picture data read out of the line buffer 18 at the HDTV rate to the dual port memory 16 in response to the control signal Se. Also, the input/output data selector 38 delivers display data read out of the memory 16 to the DA converter 40 under the control of the control signals ST from the display controller 26. The data selector 38 has two interlocked switches, not shown, one of the switches selects any one of the three inputs to the line buffer 18 and connects the selected input to either one of the two inputs of the dual port memory 18 and the other switch connects the other output of the dual port memory 18 to the output line which terminates at the DA converter 40.

The DA converter 40 converts, in response to the control signal ST from the display controller 26, the digital picture data fed thereto from the input/out data selector 38 to analog data. The output of the DA converter 40 is displayed on the HDTV monitor 14.

Referring again to FIG. 2A, the dual port memory 16 has two banks 0 and 1 each having two memory fields L1 and L2. The memory fields L1 and L2 of each bank 0 or 1 are connected to the random port and serial port of the bank in common with each other. One HDTV scanning line of video data made up of line picture data and graphic data is stored in each of the memory fields L1 and L2. Specifically, line picture data from the NTSC TV camera 10 are applied to each serial port of the dual port memory 16 via the input/output data selector 38, FIG. 2B, while graphic data from the graphic processor 12 are applied to each random port of the memory 16. Addresses of the memory fields L1 and L2 are selected by the multiplexed address signals A1 and A2 which are delivered to the dual port memory 16 via the data address selector 36, whereby the line picture data and graphic data are written to the memory fields L1 and L2. An address signal A3 is fed from the NTSC input controller 30 to the dual port memory 16 via the data address selector 36, so that the picture data or the graphic data is read out of the memory field L1 or L2 via the serial port. In this case, as shown in FIGS. 4A–4D, one horizontal line of data is transferred in parallel from the memory field L1 or L2 to the serial port during the horizontal blanking period H of the HDTV monitor 14, and then display data Di are serially outputted in response to a serial clock Sk. The random ports of the dual port memory 16 can write or read data in or out of any address of the memory fields L1 and L2 during periods other than the transfer cycle (T) period to the serial ports which is included in the horizontal blanking period H.

Figure 3:
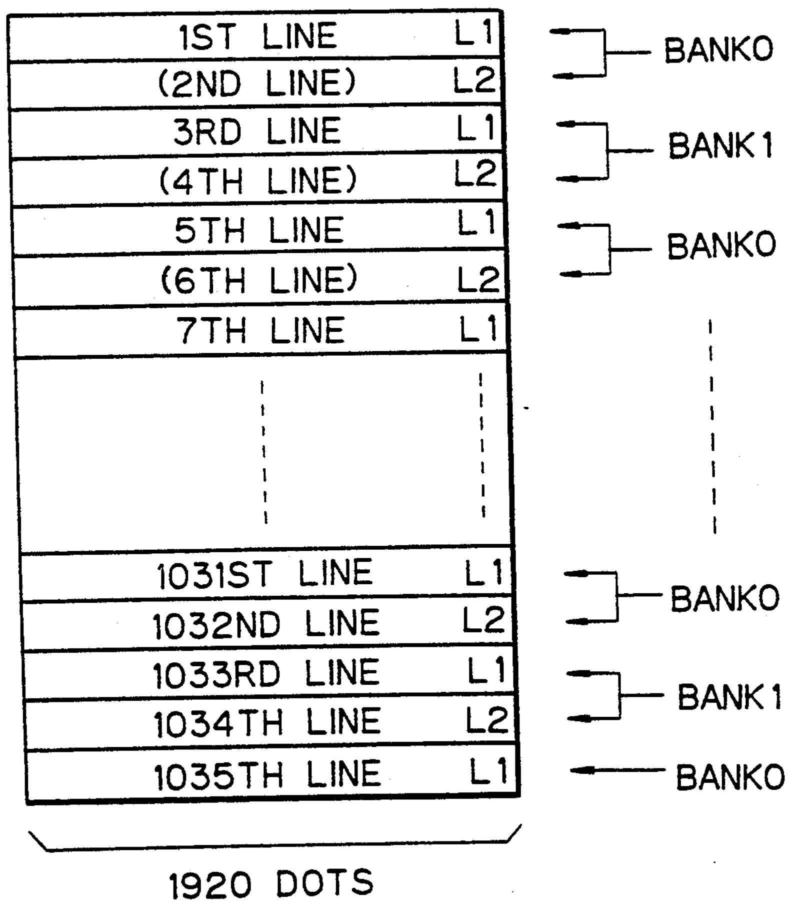
FIG. 3 shows a first and a second field of an HDTV picture of the embodiment specifically.
Figures 4A, 4B, 4C, 4D:
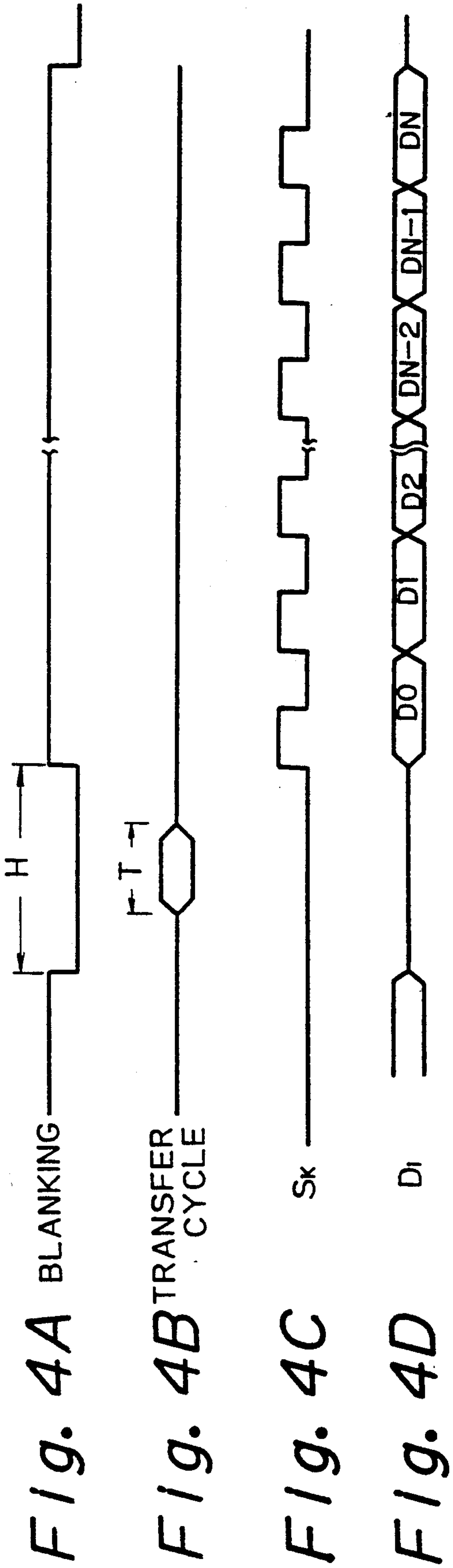
FIGS. 4A–4D are timing charts representative of a sequence for reading out data to be displayed particular to the present embodiment.

FIG. 3 shows a specific format of an HDTV picture frame. As shown, each scanning line has 1,920 dots thereon, such that one line of data can be stored in each of the memory fields L1 and L2 and serial ports of the dual port memory 16. 1,035 scanning lines each having the above-mentioned capacity constitute one picture frame of the HDTV monitor 14. On the HDTV monitor 14, all the scanning lines are converted into an analog form and scanned in the conventional interlace scanning fashion, i.e., odd lines and even lines are sequentially displayed in this order. The first field of the picture frame, i.e., the first and successive odd lines up to the 1,035th line are alternately written and read out of the memory fields L1 of the banks 0 and 1 of the dual port memory 16. Likewise, the second and successive even lines up to the 1,034th line constituting the second field of the picture frame are alternately written and read out of the memory fields L2 of the banks 0 and 1.

Figure 5:
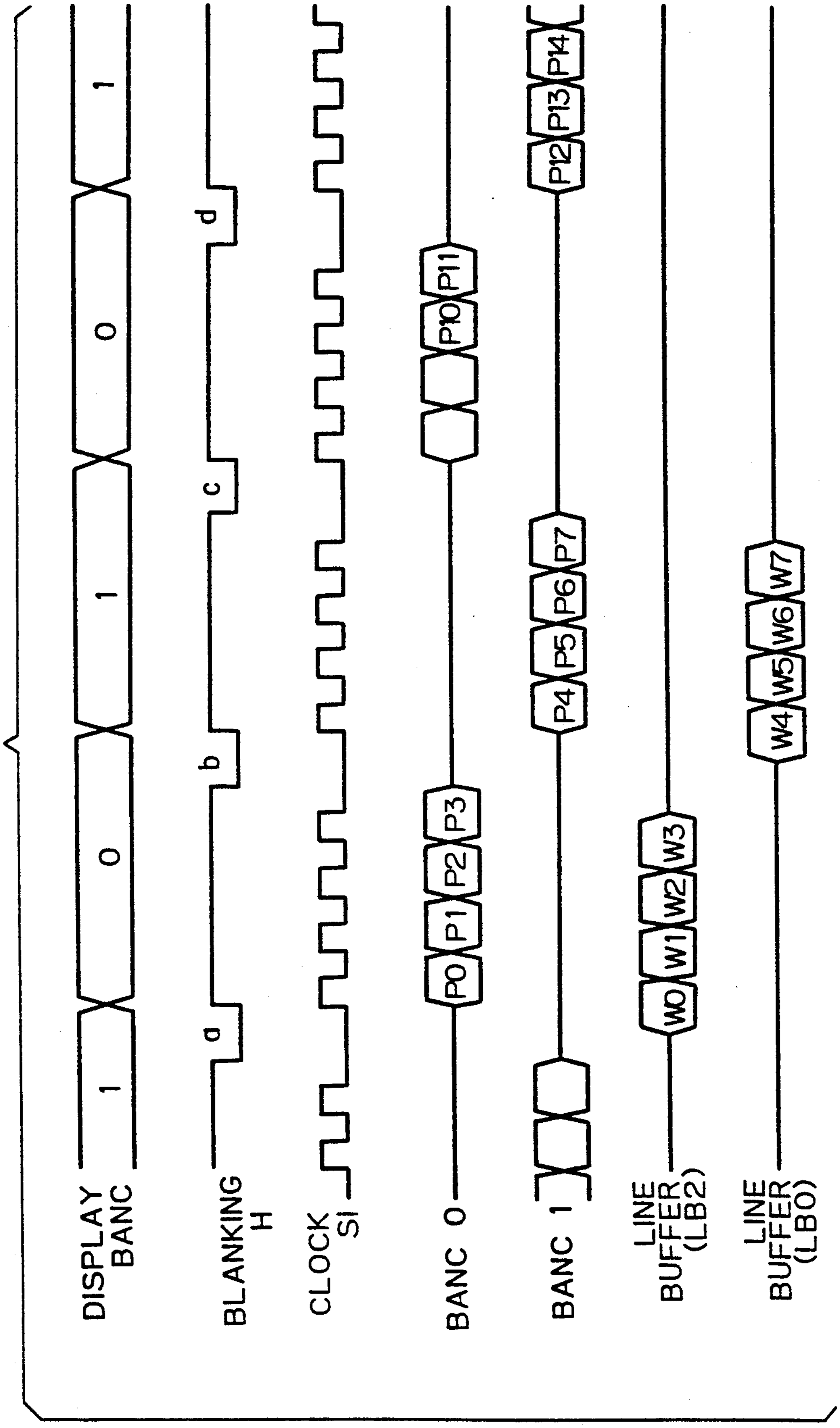
FIG. 5 is a timing chart indicative of a specific sequence for accessing a dual port memory included in the embodiment.

Specifically, as shown in FIG. 5, the banks 0 and 1 of the dual port memory 16 for transferring data to the HDTV monitor 14 are selected alternately. For example, when display data P0–P3 of the third scanning line stored in the bank 0 are read out via the serial port of the bank 0 and the input/output data selector 38 in response to a serial clock Si, data W0–W3 which will constitute the fifth scanning line are sequentially read out of, for example, the line buffer LB2 of the buffer 18 and applied to the serial port of the other bank 1 via the data selector 38. On the other hand, when the data W0–W3 are read out of the bank 1 as display data P4–P7, data W4–W7 which will constitute the seventh scanning line are sequentially written to the bank 0. In this manner, data are alternately written to and read out of the two banks 0 and 1 by HDTV interlace scanning.

Figure 6A:
FIGS. 6A and 6B are charts demonstrating image data transfer and write cycles occurring during a horizontal blanking period in the present embodiment.
Figure 6B:
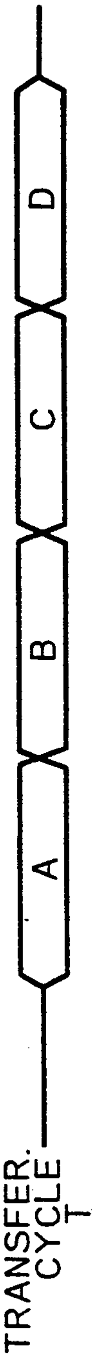

As shown in FIGS. 6A and 6B, the transfer of display data Di and recorded data Dr between the memory field L1 (L2) and the associated serial port is effected in a transfer cycle T during the horizontal blanking period H of the HDTV monitor 14. For example, in a blanking period b shown in FIG. 5, data W0–W3 having been written to the serial port of the bank 1 are transferred to the memory field L1 of the bank 1 in a transfer cycle A. In the subsequent transfer cycle B, a determination for which of the serial ports of the banks 0 and 1 should have the recorded data stored in the line buffer 18 written therein is made. In this specific case, the serial port of the bank 0 is selected, and from which address of the serial port the recorded data should be written is determined. Specifically, a particular column address of the serial port of interest is designated to start writing the data.

In a transfer cycle C, the serial port of the bank 0 having been selected in the cycle B is conditioned for input. Thereafter, as the write timing signal is fed from the NTSC controller 30, recorded data W4–W7 having been stored in the line buffer LB0 are transferred to the serial port of the bank 0 via the input/out data selector 38, as shown in FIG. 5. In the subsequent transfer cycle D, display data P4–P7 generated on the basis of graphic data and recorded data W0–W3 by the memory field L1 of the bank 1 and constituting the fifth scanning line are transferred to the serial port associated with the bank 1. At this instant, the data from the memory field L1 are transferred in parallel to the serial port of the dual port memory 16. Subsequently, when the display controller 26 feeds the timing signal ST, the display data P4–P7 are sequentially read out of the serial port of interest and displayed on the HDTV monitor 14.

Likewise, in the next blanking period c, the recorded data W4–S7 having been written to the serial port of the bank 0 are transferred to the memory field L1 of the bank 0 to constitute display data P8–P11. After the start position of a particular port to which recorded data, not shown, having been stored in the line buffer LB1 should be written, i.e., the serial port of the bank 1 has been determined, the port of interest is conditioned for input to start writing the recorded data therein. Finally, display data P8–P11 produced by the memory field L1 of the bank 0 are transported to the serial port of the bank 0 to be read out.

As stated above, in the illustrative embodiment, the transfer of data between the memory fields and the serial port of one bank and the switchover of the other bank from an output state to an input state are performed during a blanking period. In a display period which follows the blanking period, serial data are inputted to or outputted from the serial port of each bank.

During periods other than the blanking periods, graphic data from the graphic processor 12 are written to any one of the memory fields L1 and L2 of the dual port memory 16 via the associated random ports and independently of the access made to the serial ports. The graphic data are combined with or inserted into the recorded data which are written to the memory field L1 or L2 via the serial port of the latter, which constitutes one horizontal scanning line of display data. As a result, a moving picture and a computer-generated picture such as animation can exist together in the display data to be outputted to the HDTV monitor 14 via the serial port.

While the dual port memory 16 has been shown and described as having two memory fields L1 and L2, the dual port memory 16 may be replaced with a dual port memory having a single memory field, in which case the memory field will be shared by a first and a second HDTV field. The HDTV monitor 14 is only illustrative and may be implemented as any other suitable type of monitor. Specifically, if the timing of the display controller 26 is changed from the timing of an HDTV system to the timing of another system, the illustrative embodiment is connectable to a monitor of such an alternative system. Furthermore, the embodiment is practicable even with a camera other than the NTSC camera 10.

In summary, it will be seen that the embodiments of the present invention provide an image displaying apparatus in which a dual port memory, or a video memory, has a plurality of banks each having a capacity great enough to accommodate one scanning line of video data. The video data are written to and read out of the serial inputting/outputting sections of the banks via selecting units. This is successful in eliminating the need for a conventional expensive field memory and, therefore, in implementing an inexpensive image displaying apparatus with an enhanced real-time display capacity.

While the present invention has been described with reference to the particular illustrative embodiment, it is not to be restricted by the present embodiments but only by the appended claims. It is to be appreciated that those skilled in the art can change or modify the embodiment without departing from the scope and spirit of the present invention.

What is claimed is:

1. An apparatus for transferring video data fed from an image pick-up device and displaying the video data on a video monitor, comprising:

video memory means comprising at least two memory fields, each of said memory fields having serial inputting/outputting means for selectively inputting or outputting data serially and random inputting/outputting means for selectively inputting or outputting data randomly, said memory fields each having a capacity great enough to store video data constituting at least one scanning line of a video frame to be displayed on the video monitor;

selecting means for selectively applying the video data from the image pick-up device to either one of said serial inputting/outputting means of said memory fields of said video memory means; and control means for controlling said video memory means and said selecting means such that the video data fed from the image pick-up device via said selecting means are sequentially inputted to each of said serial inputting/outputting means of said video memory means during each horizontal scanning line, and another kind of data from said random inputting/outputting means of said video memory means is stored in said memory fields, whereby each said horizontal scanning line of the video data of said video frame to be displayed on the video monitor is sequentially stored in each of said memory fields, and each said horizontal scanning line of the video data stored in each of said memory fields is sequentially transferred to the video monitor via said serial inputting/outputting means.

2. An apparatus in accordance with claim 1, wherein said serial inputting/outputting means of said video memory means each transfers, on receiving one of said horizontal scanning lines of the video data from the image pick-up device, said one horizontal scanning line of the video data in parallel to one of said memory fields associated therewith or, on receiving said one horizontal scanning line of the video data from said one memory field in parallel, outputting said one horizontal scanning line of the video data serially;

said control means effecting the transfer of the video data between said serial inputting/outputting means and said one memory field during a blanking period of said video monitor.

3. An apparatus in accordance with claim 2, wherein said memory fields of said video memory each comprises a first memory field and a second memory field each having a capacity great enough to store one horizontal scanning line of the video data of said video frame of the video monitor;

said first memory field and said second memory field being used alternately as memory fields each corresponding to respective ones of an odd field and an even field of said video frame of the video monitor.

4. An apparatus in accordance with claim 2, wherein said control means writes graphic data to said video memory means in a period other than said blanking period via said random inputting/outputting means, transfers said graphic data to the video monitor together with the video data from the image pick-up device, and thereby displays a moving picture and a graphic picture on the video monitor at the same time.

5. An apparatus in accordance with claim 2, further comprising an input section thereof for inputting the video data from the image pick-up device for changing an input/output rate for each said horizontal scanning line of the video data.

6. A method for transferring video data fed from an image pick-up device and displaying the video data on a video monitor, comprising the steps of:

(a) selectively inputting or outputting data serially from at least two memory fields having a capacity great enough to store video data constituting at least one scanning line of a video frame to be displayed on the video monitor by serial inputting/outputting means;

(b) selectively inputting or outputting data randomly from said memory fields by random inputting/outputting means;

(c) selectively applying the video data from the image pick-up device to either one of said serial inputting/outputting means of said memory fields by selecting means;

(d) controlling said steps (a)-(c) such that the video data fed from the image pick-up device via said selecting means are sequentially inputted to each of said serial inputting/outputting means for said memory fields during each horizontal scanning line and another kind of data from said random inputting/outputting means is stored in said memory fields;

(e) sequentially storing each said horizontal scanning line of the video data of said video frame to be displayed on the video monitor in each of said memory fields; and (f) sequentially transferring each said horizontal scanning line of the video data stored in each of said memory fields to the video monitor via said serial inputting/outputting means.

7. A method in accordance with claim 6, further comprising the steps of:

(g) transferring one of said horizontal scanning lines of the video data in parallel to one of said memory fields associated with said serial inputting/outputting means of each said memory field upon receiving said one horizontal scanning line of the video data from the image pick-up device;

(h) outputting said one horizontal scanning line of the video data serially upon receiving said one horizontal scanning line of the video data from said one memory field in parallel; and (i) effecting the transfer of the video data at said step (d) between said serial inputting/outputting means and said one memory field during a blanking period in the video monitor.

8. A method in accordance with claim 6, further comprising the steps of storing one horizontal scanning line of the video data of said video frame of the video monitor in a first memory field and a second memory field of said memory fields each having a capacity great enough to store said one horizontal scanning line therein and alternately using said first and second memory fields as memory fields each corresponding to respective ones of an odd field and an even field of said video frame of the video monitor.

9. A method in accordance with claim 6, further comprising the steps of writing graphic data to said memory fields in a period other than said blanking period via said random inputting/outputting means, transferring said graphic data to the video monitor together with the video data from the image pick-up device, and displaying a moving picture and a graphic picture on the video monitor at the same time.

10. A method in accordance with claim 6, further comprising the steps of inputting the video data from the image pick-up device and changing an input/output rate for each said horizontal scanning line of the video data.

* * * * *